United States Patent
Matsuo

(10) Patent No.: US 9,903,296 B2
(45) Date of Patent: Feb. 27, 2018

(54) CONTROL DEVICE FOR TURBOCHARGER

(71) Applicant: MITSUBISHI HEAVY INDUSTRIES, LTD., Tokyo (JP)

(72) Inventor: Atsushi Matsuo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/025,641

(22) PCT Filed: Nov. 27, 2014

(86) PCT No.: PCT/JP2014/081387
§ 371 (c)(1),
(2) Date: Mar. 29, 2016

(87) PCT Pub. No.: WO2015/083614
PCT Pub. Date: Jun. 11, 2015

(65) Prior Publication Data
US 2016/0237936 A1 Aug. 18, 2016

(30) Foreign Application Priority Data
Dec. 4, 2013 (JP) .................................. 2013-251253

(51) Int. Cl.
*F02D 41/22* (2006.01)
*F02B 39/16* (2006.01)
(Continued)

(52) U.S. Cl.
CPC .............. *F02D 41/22* (2013.01); *F02B 37/12* (2013.01); *F02B 39/16* (2013.01); *F02D 21/08* (2013.01);
(Continued)

(58) Field of Classification Search
CPC ...... F02D 41/22; F02D 21/08; F02D 41/0007; F02D 41/221; F02D 2041/228;
(Continued)

(56) References Cited

U.S. PATENT DOCUMENTS 4,672,814 A * 6/1987 Abo ................. F02B 37/12
60/602
4,698,972 A * 10/1987 Ueno ................. F02B 37/18
60/602

(Continued)

FOREIGN PATENT DOCUMENTS

CN 1360714 A 1/2008
CN 101105429 A 1/2008
(Continued)

OTHER PUBLICATIONS

Extended European Search Report, dated Jul. 1, 2016, for European Application No. 14868701.5.
(Continued)

*Primary Examiner* — Calvin Cheung
(74) *Attorney, Agent, or Firm* — Birch, Stewart, Kolasch & Birch, LLP

(57) ABSTRACT

The present invention relates to a control device (26) for a turbocharger (17) for supplying compressed intake air to an internal combustion engine (1). The control device includes: a storage part (27) configured to pre-store a map (33); a detection part (28) configured to a characteristic parameter; a calculation part (29) configured to obtain an efficiency η of the turbocharger on the basis of the detected characteristic parameter; a determination part (30) configured to determine presence of deterioration of the turbocharger by comparing the detected characteristic parameter and the obtained efficiency η with the map (33); and an informing part (31) configured to inform a user of a maintenance request.

6 Claims, 7 Drawing Sheets

(51) Int. Cl.
    *F02B 37/12* (2006.01)
    *F02D 41/00* (2006.01)
    *F02D 21/08* (2006.01)

(52) U.S. Cl.
    CPC ....... *F02D 41/0007* (2013.01); *F02D 41/221* (2013.01); *F02B 2039/166* (2013.01); *F02B 2039/168* (2013.01); *F02D 2041/228* (2013.01); *F02D 2200/0406* (2013.01); *F02D 2200/0414* (2013.01); *Y02T 10/144* (2013.01)

(58) Field of Classification Search
    CPC ..... F02D 2200/0406; F02D 2200/0414; F02B 37/12; F02B 39/16; F02B 2039/166; F02B 2039/168; Y02T 10/144
    See application file for complete search history.

(56) References Cited

U.S. PATENT DOCUMENTS

| | | | |
|---|---|---|---|
| 4,756,377 A | 7/1988 | Kawamura et al. | |
| 4,774,811 A | 10/1988 | Kawamura | |
| 4,884,407 A | 12/1989 | Hatanaka | |
| 5,073,865 A * | 12/1991 | Togai | B60K 28/16 180/197 |
| 5,645,033 A | 7/1997 | Person et al. | |
| 6,089,018 A | 7/2000 | Bischoff et al. | |
| 6,158,416 A * | 12/2000 | Chen | F02D 31/009 123/380 |
| 6,209,390 B1 | 4/2001 | LaRue et al. | |
| 6,327,856 B1* | 12/2001 | Iwabuchi | F02B 1/12 60/602 |
| 8,051,661 B2 | 11/2011 | Igarashi et al. | |
| 8,584,460 B2 | 11/2013 | Måardberg et al. | |
| 8,813,494 B2 | 8/2014 | Hofer et al. | |
| 2003/0145591 A1 | 8/2003 | Arnold | |
| 2003/0216856 A1* | 11/2003 | Jacobson | F02B 37/00 701/114 |
| 2004/0139809 A1 | 7/2004 | Soechting et al. | |
| 2004/0187495 A1 | 9/2004 | Ando et al. | |
| 2005/0193810 A1 | 9/2005 | Gladden | |
| 2006/0021344 A1 | 2/2006 | Barba et al. | |
| 2006/0026960 A1 | 2/2006 | Butscher et al. | |
| 2006/0113799 A1 | 6/2006 | Obayashi et al. | |
| 2006/0225418 A1* | 10/2006 | Kishimoto | F02B 37/22 60/605.1 |
| 2006/0248889 A1* | 11/2006 | Sagisaka | F02B 37/18 60/602 |
| 2006/0287795 A1 | 12/2006 | Samad et al. | |
| 2008/0022679 A1* | 1/2008 | Hara | F02B 37/18 60/602 |
| 2008/0047268 A1 | 2/2008 | Isogai et al. | |
| 2008/0053091 A1* | 3/2008 | Barthelet | F02B 37/10 60/608 |
| 2009/0107140 A1 | 4/2009 | Pursifull | |
| 2009/0222190 A1 | 9/2009 | Andreae et al. | |
| 2009/0287448 A1 | 11/2009 | Brown et al. | |
| 2009/0299609 A1 | 12/2009 | Gokhale | |
| 2011/0192161 A1 | 8/2011 | Takahaski et al. | |
| 2011/0288744 A1 | 11/2011 | Gokhale et al. | |
| 2013/0042609 A1* | 2/2013 | Cianflone | F02D 41/0062 60/602 |
| 2013/0167810 A1 | 7/2013 | Roplekar et al. | |
| 2013/0227944 A1 | 9/2013 | Denholm et al. | |
| 2015/0037178 A1 | 2/2015 | Wang | |
| 2015/0068506 A1* | 3/2015 | Gokhale | F02D 41/401 123/679 |
| 2015/0122234 A1 | 5/2015 | Tanaka | |
| 2015/0285122 A1 | 10/2015 | Yamashita et al. | |
| 2016/0312687 A1* | 10/2016 | Kemmerling | F02B 37/002 |
| 2017/0002726 A1 | 1/2017 | Iwamoto | |

FOREIGN PATENT DOCUMENTS

| | | |
|---|---|---|
| CN | 101424211 A | 5/2009 |
| CN | 101273385 B | 5/2010 |
| CN | 102177323 A | 9/2011 |
| CN | 102418610 A | 4/2012 |
| EP | 2 317 082 A2 | 5/2011 |
| EP | 2434123 A1 | 3/2012 |
| JP | 58-53643 A | 3/1983 |
| JP | 59-52139 U | 4/1984 |
| JP | 61-38127 U | 3/1986 |
| JP | 62-210222 A | 9/1987 |
| JP | 64-32019 A | 2/1989 |
| JP | 5-33668 A | 2/1993 |
| JP | 5-280365 A | 10/1993 |
| JP | 6-323158 A | 11/1994 |
| JP | 6-341325 A | 12/1994 |
| JP | 7-150990 A | 6/1995 |
| JP | 8-836555 A | 12/1996 |
| JP | 9-329032 A | 12/1997 |
| JP | 10-159576 A | 6/1998 |
| JP | 2000-179348 A | 6/2000 |
| JP | 2000-356158 A | 12/2000 |
| JP | 2001-342840 A | 12/2001 |
| JP | 2002-188474 A | 7/2002 |
| JP | 2002-544443 A | 12/2002 |
| JP | 2003-227362 A | 8/2003 |
| JP | 2003-209183 A | 9/2003 |
| JP | 2004-27897 A | 1/2004 |
| JP | 2004-251203 A | 9/2004 |
| JP | 2005-83317 A | 3/2005 |
| JP | 2005-155384 A | 6/2005 |
| JP | 2005-248952 A | 9/2005 |
| JP | 2005-351129 A | 12/2005 |
| JP | 2006-63873 A | 3/2006 |
| JP | 2006-188989 A | 7/2006 |
| JP | 2006-207506 A | 8/2006 |
| JP | 2006-242462 A | 9/2006 |
| JP | 2006-242487 A | 9/2006 |
| JP | 2007-32860 A | 2/2007 |
| JP | 2007-206007 A | 8/2007 |
| JP | 2008-45410 A | 2/2008 |
| JP | 2008-544144 A | 4/2008 |
| JP | 2008-175126 A | 7/2008 |
| JP | 4209350 B2 | 1/2009 |
| JP | 2010-14122 A | 1/2010 |
| JP | 4415912 B2 | 2/2010 |
| JP | 2010-180710 A | 8/2010 |
| JP | 2010-190145 A | 9/2010 |
| JP | 2011-247181 A | 12/2011 |
| JP | 2011-256743 A | 12/2011 |
| JP | 2012-7544 A | 1/2012 |
| JP | 2012-52508 A | 3/2012 |
| JP | 2013-19319 A | 1/2013 |
| JP | WO 2013/066529 A1 | 5/2013 |
| JP | 2013-127221 A | 6/2013 |
| JP | 2013-133776 A | 7/2013 |
| JP | 2013-185441 A | 9/2013 |
| JP | 2013-217382 A | 10/2013 |
| JP | 2014-84772 A | 5/2014 |
| WO | WO 00/70562 A1 | 11/2000 |
| WO | WO 03/071111 A1 | 8/2003 |
| WO | WO 2006/138545 A1 | 12/2006 |
| WO | WO 2007/055094 A1 | 5/2007 |
| WO | WO 2007/141613 A1 | 12/2007 |
| WO | WO 2013/004595 A1 | 1/2013 |
| WO | WO 2013/157126 A1 | 10/2013 |

OTHER PUBLICATIONS

Extended European Search Report dated Jan. 10, 2017 issued in the corresponding EP Application No. 14867944.2
Partial Supplementary European Search Report, dated Feb. 28, 2017, for European Application No. 14868535.7.
Partial Supplementary European Search Report, dated Mar. 2, 2017, for European Application No. 14867002.9.
International Preliminary Report on Patentability and Written Opinion of the International Searching Authority (Forms PCT/IB/338,

(56) References Cited

OTHER PUBLICATIONS

PCT/IB/373, PCT/ISA/237 and PCT/IB/326), dated Jun. 16, 2016, for International Application No. PCT/JP2014/079634, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081381, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081384, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081387, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081723, together with an English translation thereof.
International Search Report and Written Opinion of the International Searching Authority (Forms PCT/ISA/210, PCT/ISA/220 and PCT/ISA/237), dated Feb. 3, 2015, for International Application No. PCT/JP2014/079634.
International Search Report and Written Opinion of the International Searching Authority (Forms PCT/ISA/210, PCT/ISA/220 and PCT/ISA/237), dated Jan. 27, 2015, for International Application No. PCT/JP2014/081384.
International Search Report and Written Opinion of the International Searching Authority (Forms PCT/ISA/210, PCT/ISA/220 and PCT/ISA/237), dated Mar. 3, 2015, for International Application No. PCT/JP2014/081381.
International Search Report and Written Opinion of the International Searching Authority (Forms PCT/ISA/210, PCT/ISA/220 and PCT/ISA/237), dated Mar. 3, 2015, for International Application No. PCT/JP2014/081387.
International Search Report and Written Opinion of the International Searching Authority (Forms PCT/ISA/210, PCT/ISA/220 and PCT/ISA/237), dated Mar. 3, 2015, for International Application No. PCT/JP2014/081723.
Extended European Search Report dated Nov. 4, 2016 in corresponding EP Application No. 14868295.8.
Office Action dated May 31, 2017, issued to the corresponding Chinese Application No. 201480051228.1 with an English translation.
Extended European Search Report, dated Jun. 8, 2017, for European Application No. 14868535.7.
Chinese Office Action and Search Report, dated Aug. 3, 2017, for Chinese Application No. 201480050503.8, with an English translation of the Office Action.
Chinese Office Action and Search Report, dated Aug. 7, 2017, for Chinese Application No. 201480050503.8, with an English translation of the Office Action.
Chinese Office Action and Search Report for Chinese Application No. 201480060612.8, dated Sep. 5, 2017, with an English translation of the Office Action.
Japanese Notification of Reasons for Refusal for Japanese Application No. 2013-251248, dated Sep. 1, 2017, with an English translation.
Chinese Office Action for Chinese Application No. 201480065709.8, dated Nov. 3, 2017 with English translation.
U.S. Office Action for U.S. Appl. No. 15/024,642, dated Sep. 15, 2017.

* cited by examiner

R,Tin,Pin,Tout,Pou → DETECTION PART

MAINTENANCE REQUEST ALERT ← INFORMING PART

OUTSIDE

US 9,903,296 B2

CONTROL DEVICE FOR TURBOCHARGER

TECHNICAL FIELD

The present invention relates to a control device for a turbocharger for supplying compressed intake air to an engine used as a power source of a ship, a vehicle, or an industry machine, for instance.

BACKGROUND ART

As a technique to improve an output of an engine, a method (supercharging) of compressing intake air with a turbocharger and supplying an engine with the compressed intake air is known. A typical turbocharger includes an exhaust turbine driven to rotate by exhaust gas flowing through an exhaust channel of an engine, and a compressor turbine for sending intake air in an intake channel into a combustion chamber, the exhaust turbine and the compressor turbine being coupled to each other. The exhaust turbine is driven to rotate by energy of exhaust gas, and the compressor turbine is driven to rotate in accordance with the exhaust turbine. As a result, intake air in the intake channel is supercharged and sent into the combustion chamber, and thereby an output of the engine improves.

In the turbocharger, the exhaust turbine and a turbo bearing are exposed to oil component contained in lubricant oil or exhaust gas under a high-temperature environment, and thus deterioration is likely to occur by sticking or coking of the oil component. Progress of such deterioration leads to wear of components of the turbocharger to decrease fuel-consumption performance of the engine, and even results in malfunction. Thus, early detection of deterioration is desirable.

Patent Document 1 discloses a technique to detect deterioration of a turbocharger of such type. The technique to detect deterioration of a turbocharger disclosed in Patent Document 1 is for a turbocharger equipped with a waste-gate valve, and is to perform abnormality determination on the basis of whether a rotation-speed change that accompanies opening and closing of the waste-gate valve is in a predicted range.

CITATION LIST

Patent Literature

Patent Document 1: JP2013-19319A

SUMMARY

Problems to be Solved

However, in Patent Document 1, determination cannot be performed while the waste-gate valve is not in operation, because the determination is performed on the basis of a rotation-speed change that accompanies opening and closing of the waste-gate valve. Further, in general, deterioration of a turbocharger affects not only the rotation speed but also various operation states of the turbocharger. Thus, deterioration of a turbocharger may not be necessarily reflected in a rotation-speed change that accompanies opening and closing of a waste-gate valve. As described above, a deteriorated state of a turbocharger may not be sufficiently detectable by determination based on a specific part of the turbocharger.

Further, Patent Document 1 cannot be applied to a turbocharger not equipped with a waste-gate valve (for instance, to a turbocharger with a variable-vane control).

The present invention was made in view of the above described problem, and an object of the present invention is to provide a control device for a turbocharger, whereby it is possible to detect deterioration of a turbocharger accurately.

Solution to the Problems

To achieve the above object, a control device for a turbocharger for supplying compressed intake air to an internal combustion engine according to the present invention comprises: a storage part configured to pre-store a map which defines a relationship between at least one characteristic parameter and an efficiency of the turbocharger; a detection part configured to detect the at least one characteristic parameter of the turbocharger; a calculation part configured to obtain the efficiency of the turbocharger on the basis of the detected at least one characteristic parameter; a determination part configured to determine presence of deterioration of the turbocharger by comparing the detected at least one characteristic parameter and the obtained efficiency with the map; and an informing part configured to inform a user of a maintenance request if the determination part determines that the deterioration is present.

According to the present invention, a relationship between the characteristic parameters of the turbocharger and the efficiency is defined in advance in form of a map, and the efficiency is compared with an efficiency obtained from the actual measurement of the characteristic parameters detected by the detection part, and thereby presence of deterioration of the turbocharger can be determined. As described above, since the deterioration of the turbocharger is determined on the basis of the efficiency of the turbocharger, the efficiency directly reflecting an influence of the deterioration on fuel-consumption performance of the engine, it is possible to determine the deterioration state of the turbocharger accurately. If it is determined that there is deterioration, the informing part issues a maintenance request, which makes it possible for a user to recognize deterioration of the turbocharger in an early stage to take a suitable measure.

According to an aspect of the present invention, the detection part is configured to detect the at least one characteristic parameter at a predetermined interval, the calculation part is configured to calculate a mean value of the efficiency corresponding to the at least one characteristic parameter having a frequency greater than a predetermined value among the detected at least one characteristic parameter, and accumulate the mean value of the efficiency in the storage part as actual-measurement data associated with the corresponding at least one characteristic parameter, and the determination part is configured to determine presence of deterioration of the turbocharger by comparing an approximate curve obtained from the accumulated actual measurement data and a reference curve obtained from the map.

According to the above aspect, deterioration is determined on the basis of a mean value of the efficiency obtained from characteristic parameters with a high frequency, which makes it possible to reduce an influence of errors and to improve reliability of deterioration determination effectively.

In this case, the determination part may be configured to determine that the deterioration of the turbocharger is present, if a first zone in which the approximate curve is above the reference curve is smaller in area than a second zone in which the approximate curve is below the reference curve, in a space in which the characteristic parameter and the efficiency are variables. According to the above aspect, comparing statistically a relationship between the approximate curve obtained from the actual measurement data and the reference curve obtained from the map makes it possible to perform highly-reliable deterioration determination, as compared to a case in which deterioration determination is performed on the basis of whether a momentary detection result is greater than a reference value.

Further, the determination part is configured to determine that the turbocharger is malfunctioning if a change rate of the efficiency of the turbocharger is greater than a predetermined value on the basis of the accumulated actual-measurement data, and the informing part is configured to issue an alert if the determination part determines that the turbocharger is malfunctioning.

Generally, whereas deterioration of a turbocharger is accompanied by a slow decrease in efficiency, a kind of malfunction of a turbocharger is accompanied by a rapid decrease in efficiency. According to the above aspect, if a change rate of efficiency of the turbocharger is so rapid that exceeds a threshold value, it is determined that the turbocharger is malfunctioning and the malfunctioning is notified distinctively from deterioration, which enables safe operation of the turbocharger.

In another aspect of the present invention, the at least one characteristic parameter comprises a speed ratio and a pressure ratio of the turbocharger, and the map is a three-dimensional map defining the efficiency corresponding to the speed ratio and the pressure ratio. As a result of researches, the present inventors found that, taking into account that performance of a turbocharger depends an inflow state of working air, which is a ratio (=speed ratio) of a rotation speed to a theoretical stage heat drop with respect to each pressure ratio, deterioration determination can be accurately carried out on the basis of an efficiency of a turbocharger as described above by using a plurality of parameters including a speed ratio and a pressure ratio as characteristic parameters of a turbocharger.

Further, an output interface capable of outputting the accumulated actual-measurement data to outside may be provided.

With the above aspect, actual measurement data used in the deterioration determination can be outputted via an output interface, which makes it possible to specifically determine an actual operational state of a turbocharger being actually used by a user. Such information is extremely useful in design development, for instance.

Advantageous Effects

According to the present embodiment, a relationship between the characteristic parameters of the turbocharger and the efficiency is determined in advance in form of a map, and the efficiency is compared with the efficiency obtained from the actual measurement of the characteristic parameters detected by the detection part, and thereby presence of deterioration of the turbocharger can be determined. As described above, since deterioration of the turbocharger is determined on the basis of the efficiency of the turbocharger, the efficiency directly reflecting an influence of the deterioration on fuel-consumption performance of the engine, it is possible to determine the deterioration state of the turbocharger accurately. If it is determined that there is deterioration, the informing part issues a maintenance request, which makes it possible for a user to recognize deterioration of the turbocharger in an early stage to take a suitable measure.

DETAILED DESCRIPTION

The embodiments of the present invention will now be described specifically with reference to the drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
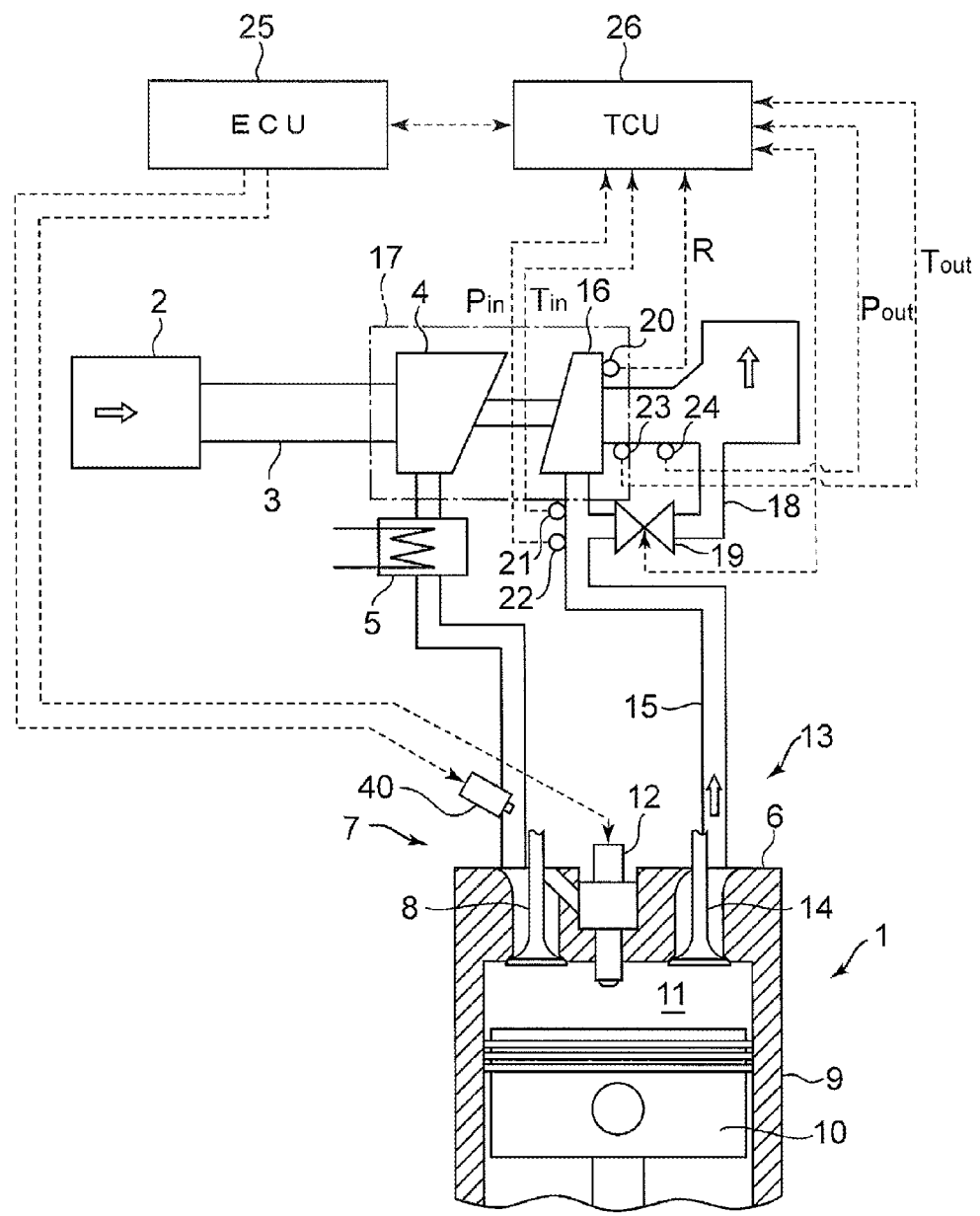
FIG. 1 is a schematic diagram of an overall configuration of a turbo-charging system including a turbocharger according to the first embodiment.

FIG. 1 is a schematic diagram of an overall configuration of a turbo-charging system including a turbocharger according to the first embodiment. An engine 1 is a gasoline engine mounted to a vehicle, a ship, or an industrial machine, for instance, as a power source. Intake air introduced from an inlet 2 flows through an intake channel 3 to be compressed by a compressor 4. Then, the intake air compressed by the compressor 4 is cooled by an inter cooler 5, and introduced into a combustion chamber 11 including a cylinder 9 and a piston 10 reciprocating in the cylinder 9 via an intake valve 8 from an intake port 7 disposed on a cylinder head 6.

When being introduced into the combustion chamber 11, the intake air is mixed with fuel injected by a fuel injection device 40 disposed in the vicinity of an inlet of the intake port 7 to produce mixed gas, and the ignition device 12 combusts the mixed gas in the combustion chamber 11. Exhaust gas generated in the combustion chamber 11 is discharged to an exhaust channel 15 via an exhaust valve 14 from an exhaust port 13. The exhaust channel 15 includes an exhaust turbine 16 driven by exhaust gas of the engine 1. The exhaust turbine 16 is driven to rotate by exhaust gas, and thereby the compressor 4 coupled to the exhaust turbine 16 is driven to rotate. Accordingly, the exhaust turbine 16 and the compressor 4 constitute a turbocharger 17 which compresses intake air in the intake channel 3.

A branch channel 18 is formed in the exhaust channel 15 so as to bypass the exhaust turbine 16. A waste-gate valve 19 is disposed in the branch channel 18. The exhaust turbine 16 is provided with a rotation speed sensor 20 for detecting a rotation speed of the exhaust turbine 16. Further, the exhaust turbine 16 is provided with an inlet temperature sensor 21 and an inlet pressure sensor 22 for detecting an inlet temperature $T_{in}$ and an inlet pressure $P_{in}$ of the exhaust turbine 16, respectively, and an outlet temperature sensor 23 and an outlet pressure sensor 24 for detecting an outlet temperature $T_{out}$ an outlet pressure $P_{out}$ the exhaust turbine 16, respectively.

The operation state of the engine 1 is controlled by an engine control unit (ECU) 25. In FIG. 1, control signals to be sent to the fuel injection device 40 and the ignition device 12 are illustrated as representative control signals of the ECU 25, the control signals controlling fuel injection timing and amount, and an ignition timing of an injector, respectively.

The operation state of the turbocharger 17 is controlled by a turbocharger control unit (TCU) 26. In FIG. 1, as representative control signals of the TCU 26, detection signals of the rotation speed sensor 20, the inlet temperature sensor 21, the inlet pressure sensor 22, the outlet temperature sensor 23, and the outlet pressure sensor 24 are obtained besides control signals for adjusting the opening degree of the waste-gate valve 19, and thereby performance deterioration of the exhaust turbocharger 17 can be determined on the basis of detection values of the detection signals, as described below.

Although illustrated as separate units in FIG. 1, the ECU 25 and the TCU 26 may be formed integrally as a single unit.

Figure 2:
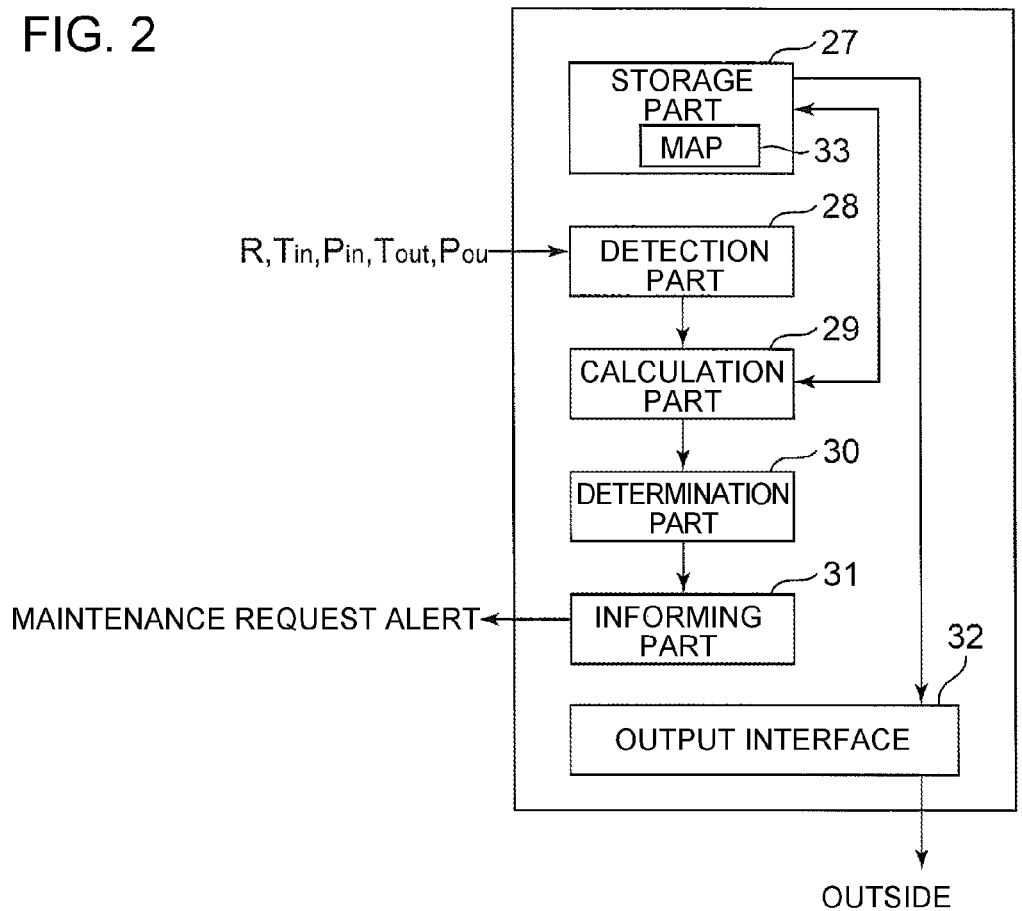
FIG. 2 is a block functional diagram illustrating an interior configuration of a TCU.

FIG. 2 is a block functional diagram illustrating an interior configuration of the TCU 26. The TCU 26 includes a storage part 27, a detection part 28, a calculation part 29, a determination part 30, an informing part 31 and an output interface 32.

The storage part 27 stores a map 33 which determines a relationship between a characteristic parameter and an efficiency of the turbocharger 17. The map 33 is stored in the storage part 27 prior to execution of a deterioration determination control, and is configured to be readable when appropriate in each step described below. The relationship between the characteristic parameter and the efficiency stored in the map 33 is determined for a sample (i.e., an ideal turbocharger 17) without deterioration, the sample serving as the basis of the deterioration determination, and the relationship may be defined in advance experimentally, theoretically, or on the basis of simulation.

Figure 3:
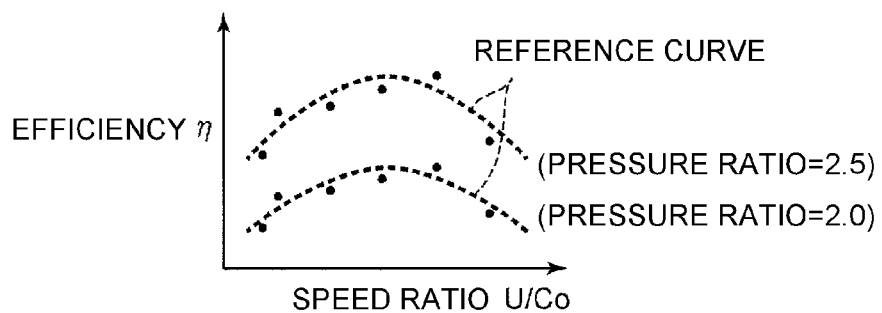
FIG. 3 is an example of a map stored in a storage unit.

FIG. 3 is an example of the map 33 stored in the storage part 27, illustrating a relationship between a speed ratio and an efficiency at different pressure ratios. As illustrated in FIG. 3, the efficiency of the turbocharger 17 stored in the map 33 can be approximated by a function including a pressure ratio and a speed ratio as variables. The approximate curves (hereinafter, referred to as "reference curves" where appropriate) are also shown in FIG. 3.

Referring again to FIG. 2, the detection part 28 obtains detection values from various sensors (the rotation speed sensor 20, the inlet temperature sensor 21, the inlet pressure sensor 22, the outlet temperature sensor 23, and the outlet pressure sensor 24) disposed on the turbocharger 17. The calculation part 29 receives detection values obtained by the detection part 28, and calculates a speed ratio, a pressure ratio, and an efficiency required for the deterioration determination, on the basis of the detection values. The determination part 30 obtains a calculation result of the calculation part 29 and compares the calculation result with the map 33 stored in the storage part 27, thereby determining presence of deterioration of the turbocharger 17.

The informing part 31 informs a user of a maintenance request if the determination part 30 determines that there is deterioration. A maintenance request widely includes information for having a user recognize deterioration of the exhaust turbocharger 17, in a broad sense. A user having received a maintenance request can take a countermeasure in an early stage to avoid an influence of reduced performance which accompanies deterioration of the turbocharger 17.

Figure 4:
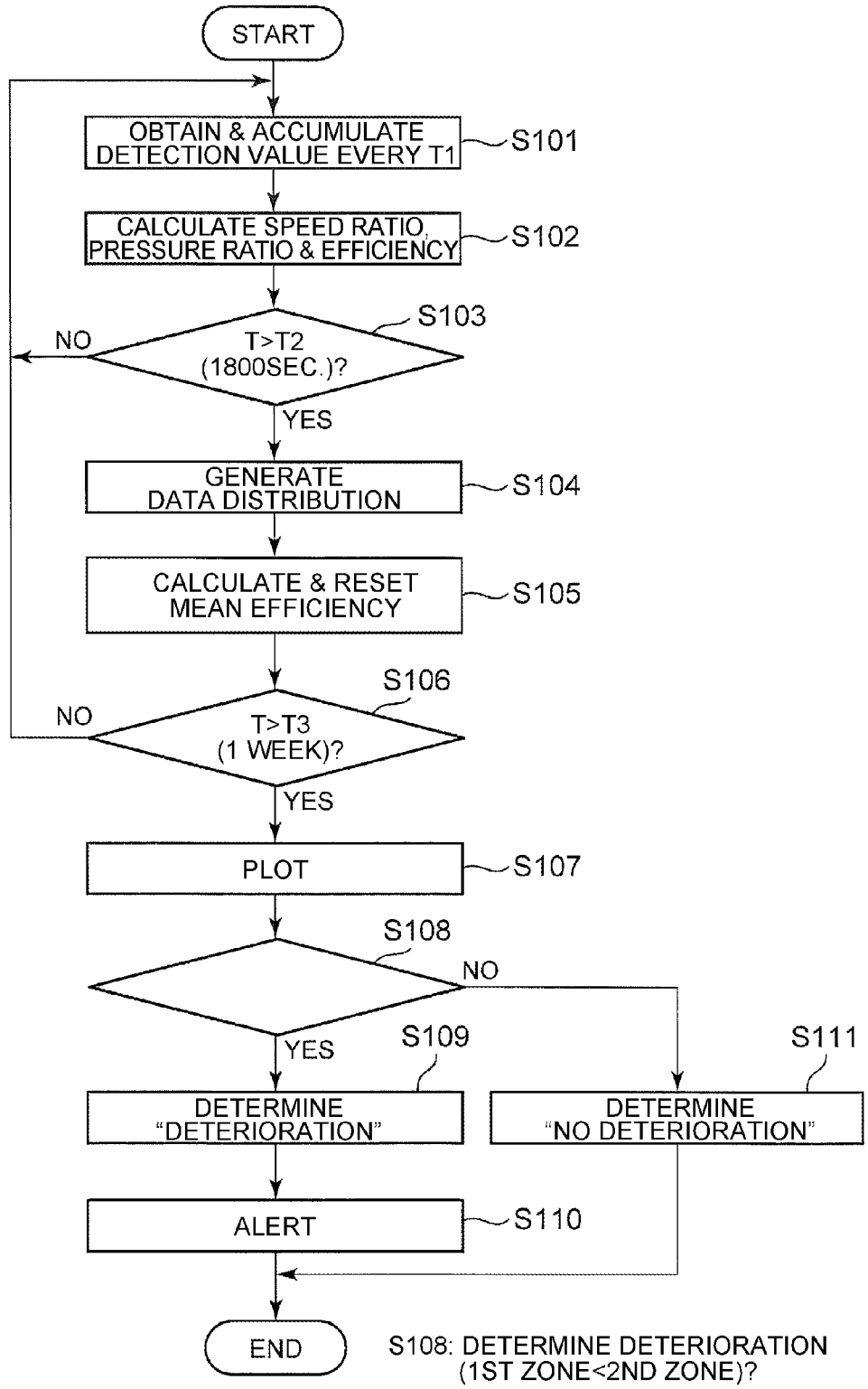
FIG. 4 is a flowchart of a deterioration determination control executed by the TCU.

Next, with reference to FIG. 4, the deterioration determination control executed by the TCU 26 will be described specifically. FIG. 4 is a flowchart of a deterioration determination control executed by the TCU 26.

First, the detection part 28 obtains detection values from various sensors at a regular interval of a predetermined period T1 (e.g. one second) (step S101). The detection values obtained by the detection part 28 may be accumulated in the storage part 27, and be readable by an external reader via the output interface 32 when appropriate. Such accumulated data is extremely advantageous in design development, for instance, because an actual operation state of the turbocharger 17 can be specifically determined from the accumulated data.

Next, the calculation part 29 receives detection values obtained by the detection part 28, and calculates a speed ratio, a pressure ratio, and an efficiency (step S102). The speed ratio can be obtained by an expression of $u/C_0$, where $u$ ($=r\omega$) is a circumferential speed the turbocharger, and $C_0$ is a speed corresponding to an adiabatic heat drop. Further, the pressure ratio can be obtained by an expression of $P_{out}/P_{in}$, where $P_{in}$ is a detection pressure value of the inlet pressure sensor and $P_{out}$ is a detection pressure value of the outlet pressure sensor. Further, the efficiency can be obtained from the following equation, where κ is a specific heat ratio.

$$\eta = \frac{T_{in} - T_{out}}{T_{in}\left\{1 - \left(\frac{P_{out}}{P_{in}}\right)^{\frac{\kappa-1}{\kappa}}\right\}}$$

Further, the calculation result obtained by the calculation part 29 also may be stored in the storage part 27 each time, and be readable by an external reader via the output interface 32 when appropriate.

Next, in step S103, it is determined whether the time T is greater than a predetermined value T2 (>T1, e.g. 1800 seconds). If not greater than T2, the process returns to step S101, and the above process is repeated (step S103: NO). Specifically, steps S101 and S102 are repeated until the time T exceeds T2.

Figure 5:
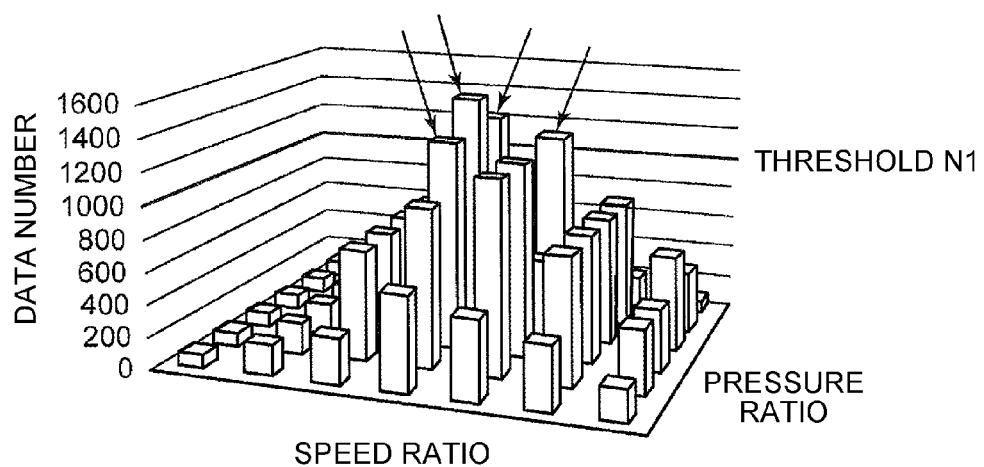
FIG. 5 is an example of data distribution generated in step S104 of FIG. 4.

When the predetermined time T2 elapses, (step S103: YES), the calculation part 29 generates data distribution of data accumulated in the storage part 27 with respect to the speed ratio and the pressure ratio (step S104). FIG. 5 is an example of data distribution generated in step S104. In FIG. 5, y-axis represents the number of data with respect to combination of the speed ratio and the pressure ratio.

The calculation part 29 calculates a mean value $\eta_{ave}$ of the efficiency calculated in step S102 using data with a number greater than a reference value N1 set in advance (N1=1000 in FIG. 5), in the above data distribution.

Data with a number greater than the reference value N1 are indicated by arrows in FIG. 5.

The calculation part 29 obtains the mean value $\eta_{ave}$ of the efficiency for the characteristic parameters with a high repetition frequency as described above, and then resets the number of data only for the characteristic parameters used in the calculation (in other words, for the other characteristic parameters not having reached the reference value N1 in FIG. 5, the number of data is maintained as it is, because the calculation of the efficiency is not performed by the calculation part 29).

While no small number of errors may be included in the operation state of the turbocharger 17 depending on the combustion state of the engine 1, it is possible to reduce an influence of errors and increase reliability by determining performance deterioration on the basis of the mean value $\eta_{ave}$ of the efficiency calculated for characteristic parameters with high detection frequency as described above.

Accordingly, the calculation part 29 calculates a mean efficiency $\eta_{ave}$ with respect a particular frequently-repeated combination of the speed ratio and the pressure ratio, for each time T2. In step S106, it is determined whether the time T is greater than a predetermined value T3 (>T2, e.g. one week). If the time T is not greater than T3, the process returns to step S101, and the above process is repeated (step S106: NO). Specifically, the above calculation is repeated until the time T exceeds T3.

When time T3 elapses (step S106: YES), the determination part 30 plots on a graph mean efficiencies $\eta_{ave}$ with respect to combinations of the speed ratio and the pressure ratio calculated so far (step S107), and compares the plotted graph with the reference curve obtained from the map 33, thereby determining presence of deterioration of the turbocharger 17 (step S108).

Figure 6:
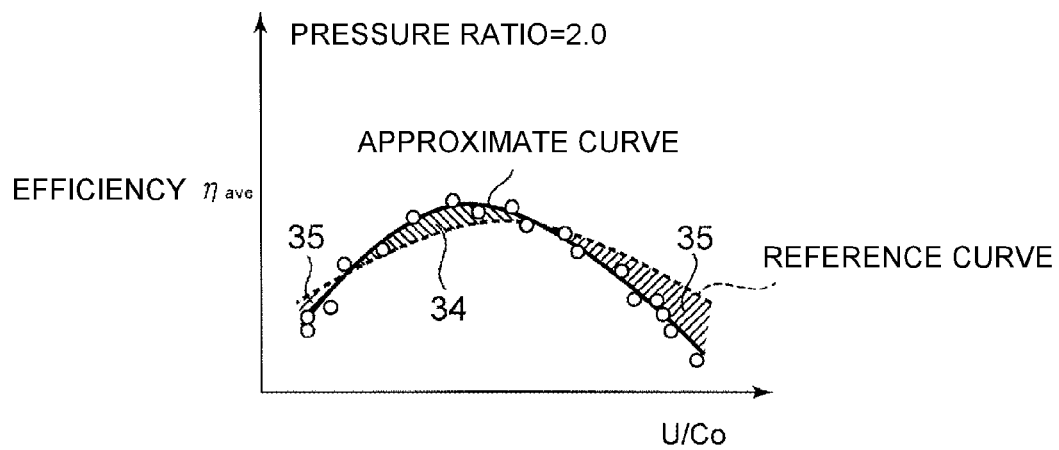
FIG. 6 is an example of a plotted graph generated in step S107 of FIG. 4.

FIG. 6 is an example of a plotted graph generated in step S107. While an example with a pressure ratio of 2.0 is illustrated in FIG. 6, deterioration is also determined for other pressure ratios by plotting similar graphs.

Particularly in the present embodiment, the determination part 30 obtains an approximate curve of the mean values $\eta_{ave}$ of the efficiency obtained in step S105, and compares the approximate curve with the reference curve obtained from the map 33, thereby determining presence of deterioration to the turbocharger 17. The approximate curve can be obtained by a known method, such as the mean-square method.

In FIG. 6, zones surrounded by the approximate curve and the reference curve are shaded, and the first zone 34, where the approximate curve is greater than the reference curve, and the second zone 35, where the approximate curve is smaller than the reference curve, are discriminated. The determination part 30 adds up the area of the first zone 34 and the second zone 35, and if the total area is less than a criteria of a performance-decrease amount set in advance, determines that there is deterioration of the turbocharger 17 (step S109), the informing part 31 issues a maintenance request, and the process ends (step S110). Specifically, presence of deterioration of the exhaust turbocharger 17 is determined on the basis of whether the approximate curve is smaller than the reference curve statistically.

In the turbocharger, the exhaust turbine and a turbo bearing are exposed to oil component contained in lubricant oil or exhaust gas under a high-temperature environment, and thus the exhaust turbine is likely to be deteriorated by sticking of or coking of the oil component. Such deterioration can be fixed by cleaning substances adhering to rotor blades of the exhaust turbine. Thus, if the turbocharger 17 is disposed on a ship or the like and is cleanable, a message or a sound may be outputted as a maintenance request to request cleaning of the substances adhering to the rotor blades of the exhaust turbine. In contrast, if the turbocharger 17 is disposed on a vehicle or the like and cleaning the turbocharger 17 is difficult or impracticable, a message or a sound may be outputted to request replacement of the deteriorated turbocharger 17.

In contrast to the above, if the first zone 34 is larger in area than the second zone 35, it is determined that the exhaust turbocharger 17 is not deteriorated, and the process ends (steps S111).

As described above, determining deterioration statistically on the basis of a relationship between the approximate curve obtained from the actual measurement data and the reference curve obtained from the map 33 makes it possible to perform highly-reliable deterioration determination, as compared to a case in which deterioration determination is performed merely on the basis of whether a momentary detection result is greater than a reference value for a moment.

As described above, according to the present embodiment, a relationship between the characteristic parameters and the efficiency of the turbocharger 17 is determined in advance in form of the map 33, and the efficiency is compared with an efficiency obtained from the actual measurement of the characteristic parameters detected by the detection part 28, and thereby presence of deterioration of the turbocharger 17 is determined. As described above, since deterioration of the turbocharger 17 is determined on the basis of the efficiency of the turbocharger 17, the efficiency directly reflecting an influence of the deterioration on fuel-consumption performance of the engine 1, it is possible to determine the deterioration state of the turbocharger 17 accurately. If it is determined that there is deterioration, the informing part 31 issues a maintenance request, which makes it possible for a user to recognize deterioration of the turbocharger 17 in an early stage to take a suitable measure.

Modified Example

In the above embodiment, the determination part 30 determines only the presence of deterioration of the turbocharger 17. Further to this, it is possible to determine not only deterioration but also malfunction of the turbocharger 17 distinctively by monitoring a time-series change of the efficiency obtained by the calculation part 29.

In general, if the performance of the turbocharger 17 is to deteriorate, the efficiency decreases gradually with time. In contrast, if a kind of malfunction is to occur in the turbocharger 17, the efficiency is predicted to change rapidly. In the present modified example, a change rate of the mean value of the efficiency obtained in step S105 is obtained, and a time-series change of the change rate is monitored.

Figure 7A:
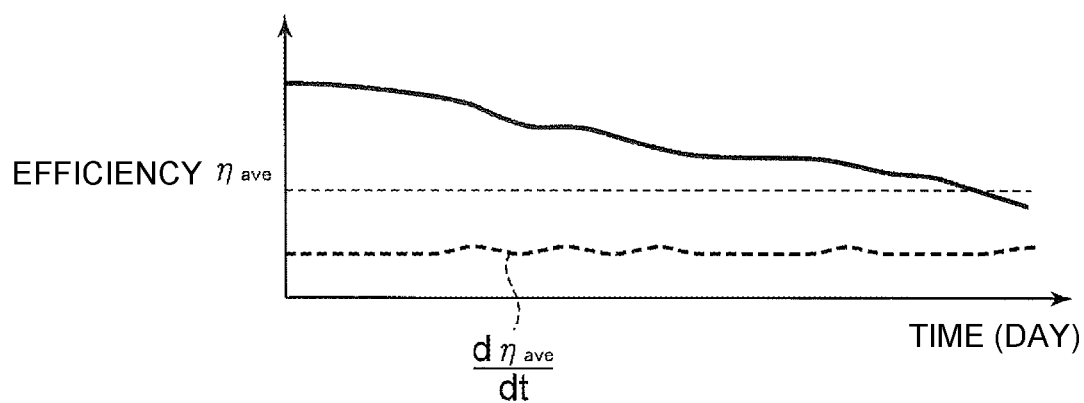
FIGS. 7A and 7B are graphs showing time-series change of a mean value $\eta_{ave}$ and its change rate $d\eta_{ave}/dt$ of efficiency in a normal state and a malfunction state.
Figure 7B:
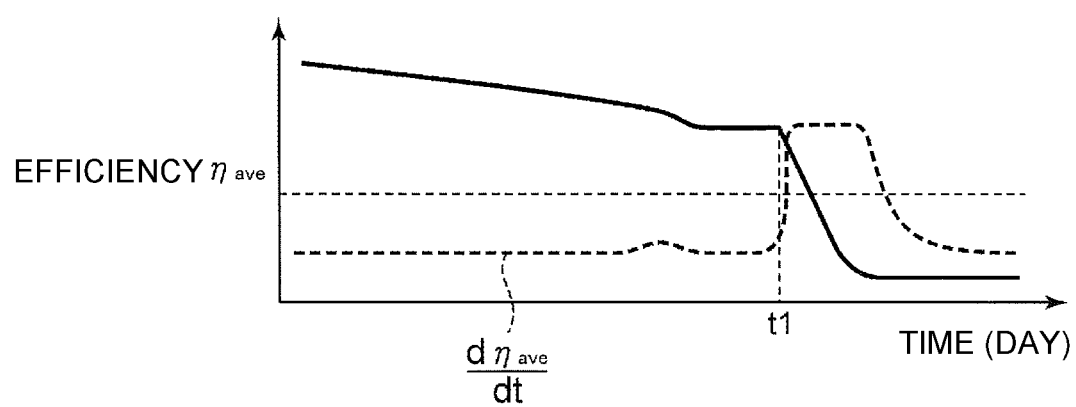

FIGS. 7A and 7B are graphs showing a time-series change of a mean value and its change rate $d\eta_{ave}/dt$ of efficiency in a normal state and a malfunction state. FIG. 7A shows a normal state, in which the efficiency $\eta_{ave}$ is gradually decreasing with time due to performance deterioration caused by aging, and the change rate $d\eta_{ave}/dt$ is substantially constant. In contrast, FIG. 7B is showing a case in which malfunction is occurring at time t1, where the efficiency $\eta_{ave}$ decreases rapidly at time t1, when malfunction occurs, and the change rate $d\eta_{ave}/dt$ of the efficiency increases rapidly for a brief time.

The determination part 30 has a threshold value $d\eta_{ave}/dt1$ prepared in advance for the change rate $d\eta_{ave}/dt$ of the efficiency to detect malfunction, and determines that malfunction has occurred if the change rate $d\eta_{ave}/dt$ is greater than the threshold value $d\eta_{ave}/dt1$. In this case, the informing part 31 issues an alert different from the maintenance request issued in case of deterioration, which makes it possible to have a user recognize occurrence of malfunction. Accordingly, informing a user of occurrence of malfunction distinctively from presence of deterioration enables highly-reliable operation of the turbocharger 17.

Second Embodiment

Figure 8:
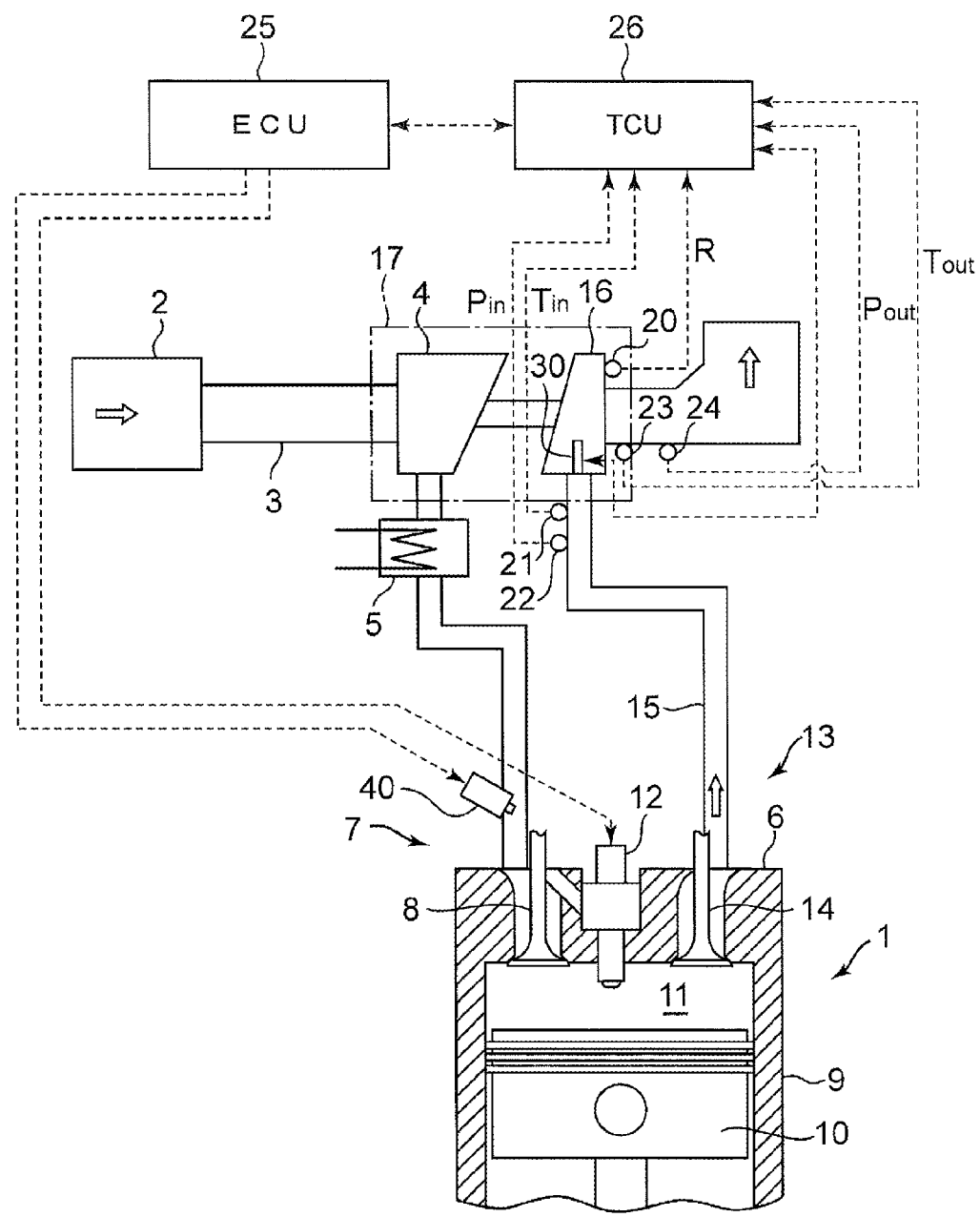
FIG. 8 is a schematic diagram of an overall configuration of a turbo-charging system including a turbocharger according to the second embodiment.

FIG. 8 is a schematic diagram of an overall configuration of a turbo-charging system including a turbocharger according to the second embodiment. The present embodiment is basically similar to the embodiment illustrated in FIG. 1 in terms of configuration, except that the branch channel 18 and the waste-gate valve 19 are not provided. Thus, the same component is associated with the same reference numeral and not described in detail.

In the present embodiment, as illustrated in FIG. 8, the turbocharger 17 is a variable turbocharger including the exhaust turbine 16 driven to rotate by exhaust energy of exhaust gas discharged from the engine 1, the compressor 4 driven coaxially with the exhaust turbine 16, and a variable control mechanism 30 for controlling a flow of exhaust gas that flows into the exhaust turbine 16. The above described TCU 26 adjusts the variable control mechanism 30 to control a flow of exhaust gas flowing into the exhaust turbine 16, thereby controlling the boost pressure of the turbocharger 17. The above turbocharger 17, for example, includes a variable-displacement type turbocharger equipped with the variable control mechanism 30 including a plurality of nozzle vanes disposed rotatably on the radially outer side of the exhaust turbine 16.

The TCU 26 obtains detection values from various sensors (the rotation speed sensor 20, the inlet temperature sensor 21, the inlet pressure sensor 22, the outlet temperature sensor 23, and the outlet pressure sensor 24) disposed on the turbocharger 17, and thereby performs the deterioration determination control on the turbocharger, similarly to the first embodiment. The deterioration determination control of the present invention can be similarly performed on a variable-displacement type turbocharger not including a waste-gate valve, because the control is based on the characteristic parameters and the efficiency which are basic characteristics independent from the configuration type of the turbocharger 17.

Third Embodiment

Figure 9:
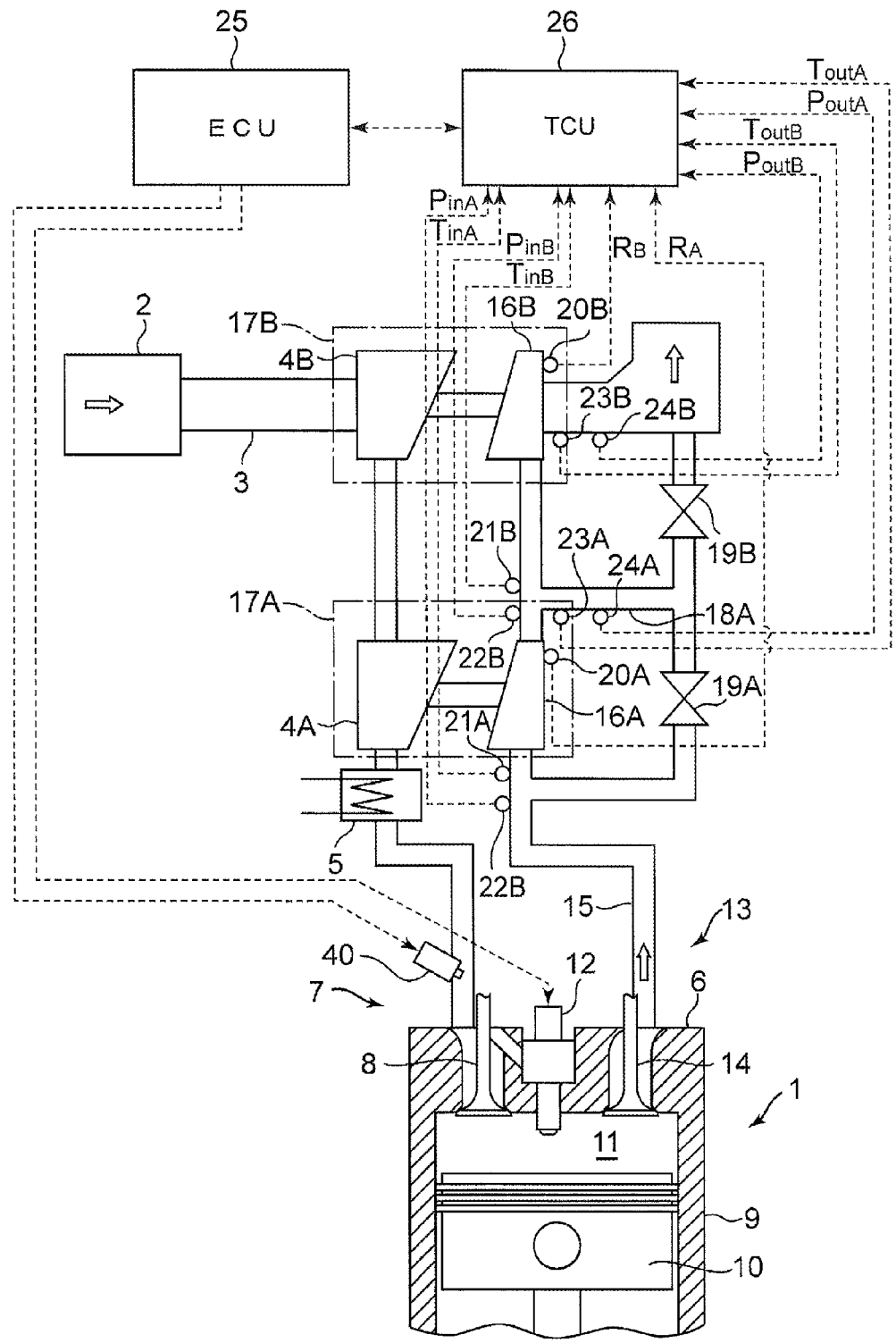
FIG. 9 is a schematic diagram of an overall configuration of a turbo-charging system including a turbocharger according to the third embodiment.

FIG. 9 is a schematic diagram of an overall configuration of a turbo-charging system including a turbocharger according to the third embodiment. The present embodiment is basically similar to the embodiment illustrated in FIG. 1 in terms of configuration except that the present embodiment is a two-stage turbo-charging system includes two turbochargers, a high-pressure stage turbocharger 17A and a low-pressure stage turbocharger 17B. Thus, the same component is associated with the same reference numeral and not described in detail.

In the present embodiment, as illustrated in FIG. 9, the turbocharger for compressing intake air to be supplied to the engine 1 includes the high-pressure stage turbocharger 17A and the low-pressure stage turbocharger 17B. The high-pressure stage turbocharger 17A includes a high-pressure stage turbine 16A disposed in the exhaust channel 15 of the engine 1 and driven to rotate by exhaust energy from the engine 1 and a high-pressure stage compressor 4A disposed in the intake channel 3 of the engine 1 and driven coaxially with the high-pressure stage turbine 16A. The low-pressure stage turbocharger 17B includes a low-pressure stage turbine 16B disposed in the exhaust channel 15 and on the downstream side of the high-pressure stage turbine 16A and a low-pressure stage compressor 4B disposed in the intake channel 3 and on the upstream side of the high-pressure stage compressor 4A and driven coaxially with the low-pressure stage turbine 16B. A high-pressure stage branch channel 18A that bypasses the high-pressure stage turbine 16A and a low-pressure branch channel 18B that bypasses the low-pressure stage turbine 16B are connected to the exhaust channel 15 of the engine 1. A high-pressure stage waste-gate valve 19A is disposed in the high-pressure stage branch channel 18A, and a low-pressure stage waste-gate valve 18B is disposed in the low-pressure branch channel 18B. The above described TCU 26 adjusts the valve opening degree of the high-pressure stage waste-gate valve 19A and the low-pressure stage waste-gate valve 19B individually, thereby controlling the boost pressure of the high-pressure stage turbocharger 17A and the low-pressure stage turbocharger 17B individually.

The high-pressure stage turbine 16A and the low-pressure stage turbine 16B include a rotation-speed sensor 20A and a rotation speed sensor 20B, respectively, for detecting the rotation speed of each turbine. Further, the high-pressure stage turbine 16A is provided with an inlet temperature sensor 21A and an inlet pressure sensor 22A for detecting an inlet temperature $T_{in}A$ and an inlet pressure $P_{in}A$ of the high-pressure stage turbine 16A, respectively, and an outlet temperature sensor 23A and an outlet pressure sensor 24A for detecting an outlet temperature $T_{out}A$ and an outlet pressure $P_{out}A$ of the high-pressure stage turbine 16A, respectively. Further, the low-pressure stage turbine 16B is provided with an inlet temperature sensor 21B and an inlet pressure sensor 22B for detecting an inlet temperature $T_{in}B$ and an inlet pressure $P_{in}B$ of the low-pressure stage turbine 16B, respectively, and an outlet temperature sensor 23B and an outlet pressure sensor 24B for detecting an outlet temperature $T_{out}B$ and an outlet pressure $P_{out}B$ of the low-pressure stage turbine 16B, respectively.

The TCU 26 obtains detection values from the above sensors, and thereby performs the deterioration determination control described specifically with reference to the first embodiment on the high-pressure stage turbocharger 17A and the low-pressure stage turbocharger 17B independently. The deterioration determination control of the present invention can be similarly introduced into a complex system including combination of a plurality of turbochargers, because the control is based on the characteristic parameters and the efficiency $\eta$, which are characteristics of the individual turbochargers 17.

INDUSTRIAL APPLICABILITY

The present invention can be suitably applied to a control device for a turbocharger disposed in an exhaust system of an internal combustion engine used as a power source of, for instance, a ship, a vehicle, or an industry machine.

DESCRIPTION OF REFERENCE NUMERALS

1 Engine
2 Inlet
3 Intake channel
4 Compressor
5 Inter cooler

6 Cylinder head
7 Intake port
8 Intake valve
9 Cylinder
10 Piston
11 Combustion chamber
12 Ignition device
13 Exhaust port
14 Exhaust valve
15 Exhaust channel
16 Exhaust turbine
17 Turbocharger
18 Branch channel
19 Waste-gate valve
20 Rotation speed sensor
21 Inlet temperature sensor
22 Inlet pressure sensor
23 Outlet temperature sensor
24 Outlet pressure sensor
25 ECU
26 TCU
27 Storage part
28 Detection part
29 Calculation part
30 Determination part
31 Informing part
32 Output interface
33 Map

The invention claimed is:

1. A turbo-charging system, comprising:
turbocharger that supplies compressed intake air to an internal combustion engine;
a rotation speed sensor that detects a circumferential speed of a turbine of the turbocharger;
an inlet temperature sensor that detects an inlet temperature of an exhaust gas upstream of the turbine;
an inlet pressure sensor that detects an inlet pressure of the exhaust gas upstream of the turbine;
an outlet temperature sensor that detects an outlet temperature of the exhaust gas downstream of the turbine;
an outlet pressure sensor that detects an outlet pressure of the exhaust gas downstream of the turbine;
a memory that pre-stores a map which defines a relationship between a speed ratio, a pressure ratio, and an efficiency of the turbocharger;
a controller that calculates an actual speed ratio based on the detected circumferential speed of the turbine, an actual pressure ratio based on the detected outlet pressure and the detected inlet pressure, and an actual efficiency calculated based on the detected inlet temperature, the detected inlet pressure, the detected outlet pressure, and the detected outlet temperature, and determines presence of deterioration of the turbocharger by comparing the actual efficiency with the efficiency pre-stored in the memory; and
an informer that informs a user of a maintenance or repair request if the controller determines presence of the deterioration of the turbocharger.

2. The turbo-charging system according to claim 1,
wherein the rotation speed sensor detects the circumferential speed, the inlet temperature sensor detects the inlet temperature, the inlet pressure sensor detects the inlet pressure, the outlet temperature sensor detects the outlet temperature, and the outlet pressure sensor detects the outlet pressure at a predetermined interval,
wherein the controller calculates a mean value of the calculated actual efficiency having a frequency greater than a predetermined value among calculated efficiencies at the predetermined interval, and accumulates the calculated mean value of the efficiency in the memory as actual-measurement data associated with the corresponding calculated speed ratio and the calculated pressure ratio, and
wherein the controller determines the presence of deterioration of the turbocharger by comparing an approximate curve obtained from the accumulated actual measurement data and a reference curve obtained from the map.

3. The turbo-charging system according to claim 2,
wherein the controller determines that the deterioration of the turbocharger is present, if a first zone in which the approximate curve is above the reference curve is smaller in area than a second zone in which the approximate curve is below the reference curve in a space in which the calculated actual pressure ratio and actual temperature ratio and the efficiency are variables.

4. The turbo-charging system according to claim 2,
wherein the controller determines that the turbocharger is malfunctioning if a change rate of the efficiency of the turbocharger is greater than a predetermined value on the basis of the accumulated actual-measurement data, and
wherein the informer issues an alert if the determination part determines that the turbocharger is malfunctioning.

5. The turbo-charging system according to claim 1,
wherein the map is a three-dimensional map defining the efficiency corresponding to the speed ratio and the pressure ratio.

6. The turbo-charging system according to claim 2, further comprising:
an output interface that outputs the accumulated actual-measurement data to outside.

* * * * *